United States Patent
Schuler et al.

(10) Patent No.: US 12,314,423 B2
(45) Date of Patent: May 27, 2025

(54) PREDICTIVE RESPONSE-GENERATION SYSTEMS TO FACILITATE TIMELY COMPLIANCE WITH INFORMATION-DISCLOSURE LAWS

(71) Applicant: MOTOROLA SOLUTIONS, INC., Chicago, IL (US)

(72) Inventors: Francesca Schuler, Palatine, IL (US); Brian J Frommelt, Naperville, IL (US); James C Duran, Palatine, IL (US); Benjamin M Jordan, Salt Lake City, UT (US); Jonathan Solomon, Longmont, CO (US)

(73) Assignee: MOTOROLA SOLUTIONS INC., Chicago, IL (US)

( * ) Notice: Subject to any disclaimer, the term of this patent is extended or adjusted under 35 U.S.C. 154(b) by 599 days.

(21) Appl. No.: 17/232,341

(22) Filed: Apr. 16, 2021

(65) Prior Publication Data

US 2022/0335154 A1  Oct. 20, 2022

(51) Int. Cl.
*G06F 21/62* (2013.01)
*G06N 7/01* (2023.01)
*G06N 20/00* (2019.01)
*G06Q 30/018* (2023.01)
*G06Q 50/26* (2012.01)

(52) U.S. Cl.
CPC ........... *G06F 21/6245* (2013.01); *G06N 7/01* (2023.01); *G06N 20/00* (2019.01); *G06Q 30/018* (2013.01); *G06Q 50/26* (2013.01)

(58) Field of Classification Search
CPC ............ G06F 21/6245; G06F 21/6254; G06F 21/6227; G06F 21/62; G06N 20/00; H04L 63/1408; H04L 63/1433
See application file for complete search history.

(56) References Cited

U.S. PATENT DOCUMENTS

| 10,664,508 | B1 | 5/2020 | Laurence et al. | |
| 11,526,502 | B1* | 12/2022 | Harris | G06F 16/252 |
| 11,531,921 | B1* | 12/2022 | Abdollahian | G06N 5/01 |

(Continued)

OTHER PUBLICATIONS

The International Search Report and the Written Opinion, corresponding patent application No. PCT/US2022/022100, filed: Mar. 28, 2022, mailed: Jul. 11, 2022, all pages.

(Continued)

*Primary Examiner* — Kevin Bechtel
*Assistant Examiner* — Sayeda Salma Nahar

(57) ABSTRACT

The present disclosure provides systems, methods, and apparatuses for a predictive response-generation service to facilitate timely compliance with information-disclosure laws. When an event associated with an electronic data collection is detected, a set of features is extracted for the electronic data collection. The features are input into a machine-learning model to generate a request-prediction score. If the probability of receiving a request for data in the electronic data collection meets a threshold, a redaction operation specified by a redaction policy is executed on the electronic data collection to generate a modified electronic data collection. The modified electronic data collection, which is a redacted version of the electronic data collection, is transmitted to a digital response repository.

20 Claims, 6 Drawing Sheets

(56) References Cited

U.S. PATENT DOCUMENTS

| | | | |
|---|---|---|---|
| 2004/0073867 A1 | 4/2004 | Kausik et al. | |
| 2010/0205020 A1 | 8/2010 | Losey | |
| 2016/0364163 A1* | 12/2016 | Kamble | H04L 63/105 |
| 2017/0155735 A1 | 6/2017 | Clothier et al. | |
| 2018/0210941 A1 | 7/2018 | Rakshit et al. | |
| 2020/0012965 A1* | 1/2020 | Silansky | G06N 20/00 |
| 2020/0064956 A1 | 2/2020 | Khoo et al. | |

OTHER PUBLICATIONS

"Predict if your FOIA request will succeed, Journalist's Resource," Harvard Kennedy School, Shorenstein Center on Media, Politics and Public Policy, Jul. 10, 2017, https://journalistsresource.org/tip-sheets/predict-foia-request-will-succeed/, downloaded from the internet: Jan. 29, 2021, all pages.

Scott Jones, "Text Classification of Freedom of Information Request: Part 1", https://towarddatascience.com/text-classification-of-freedom-of-information-requests-part-i-8a75d1e7ea02, Feb. 12, 2019, downloaded from the internet: Jan. 29, 2021, all pages.

Scott Jones, "Text Classification of Freedom of Information Request: Part 2", https://towarddatascience.com/text-classification-of-freedom-of-information-requests-part-ii-4d57b080d179, Mar. 3, 2019, downloaded from the internet: Apr. 15, 2021, all pages.

\* cited by examiner

| EXAMPLE CRITERIA FOR A PUBLICATION POLICY | | |
|---|---|---|
| CRITERION | PUBLICATION ONLINE? | BY REQUEST? |
| REDACTION-CONFIDENCE SCORE MEETS THRESHOLD OR SUFFICIENT REDACTION VERIFIED BY USER | ✓ | ✓ |
| AUTHENTICITY OF DATA VERIFIED (SOURCES RELIABLE, NO TAMPERING) | ✓ | ✓ |
| DATA SOURCES SUBJECT TO JURISDICTION OF ENTITY | ✓ | |
| DATA SOURCES APPROVED BY ENTITY | ✓ | |
| VICTIMS, MINOR, WITNESSES, AND VULNERABLE PARTIES NOT PERSONALLY IDENTIFIABLE | ✓ | ✓ |
| NUMBER OF REQUESTS RECEIVED FOR THE TOPIC MEETS A THRESHOLD | ✓ | |

| EXAMPLE SCORING RULES FOR A REDACTION POLICY ← 240 ← 350 | | |
|---|---|---|
| GROUPING | CONDITION | AMOUNT TO ADD TO REDACTION-CONFIDENCE SCORE IF CONDITION IS SATISFIED |
| 321 — ORIGINAL RESOLUTION | RESOLUTION LEVEL IS 1280 PIXELS BY 720 PIXELS OR GREATER | 1 |
| 322 — PRE-BLUR DOWNSAMPLING | DOWNSAMPLING RATIO IS 3/8 OR LESS | 1 |
| 323 — CONTENT AND SUBJECTS | CONTENT IS GRAPHIC, OFFENSIVE, OR SENSITIVE MATERIAL OR INCLUDES PII | 1 |

PREDICTIVE RESPONSE-GENERATION SYSTEMS TO FACILITATE TIMELY COMPLIANCE WITH INFORMATION-DISCLOSURE LAWS

BACKGROUND

Government agencies and other entities store many different types of data for many different purposes. Law enforcement agencies, for example, may document a crime and an ensuing criminal investigation by collecting video data (e.g., from dashboard cameras, body cameras, security cameras, or smartphone cameras), audio data (e.g., audio recordings from 9-1-1 calls and undercover telephone conversations recorded via wiretapping), image data (e.g., digital photos of crime scenes, autopsy photos, mug shots, and fingerprint images), textual data (e.g., incident reports, witness statements, email correspondence, and reports from the Combined deoxyribonucleic acid (DNA) Index System (CODIS)), and data found on hard drives or flash drives confiscated from suspects. Thus, a law enforcement agency may store a great deal of data related to each case the agency handles. If the agency handles tens of thousands of cases each year, the agency may be collecting petabytes or even exabytes of data related to those cases annually. In some jurisdictions, information-disclosure laws may oblige agencies to disclose some of that data upon request.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description below, are incorporated in, and form part of, the specification. These figures serve to illustrate various examples of elements recited in the claims and to explain various principles and advantages of those examples.

FIG. 2 provides a table that includes criteria that can be included in a publication policy, according to one illustrative and non-limiting example.

FIG. 3 provides a table that includes scoring rules that can be included in a redaction policy, according to one illustrative and non-limiting example.

Figure 1:
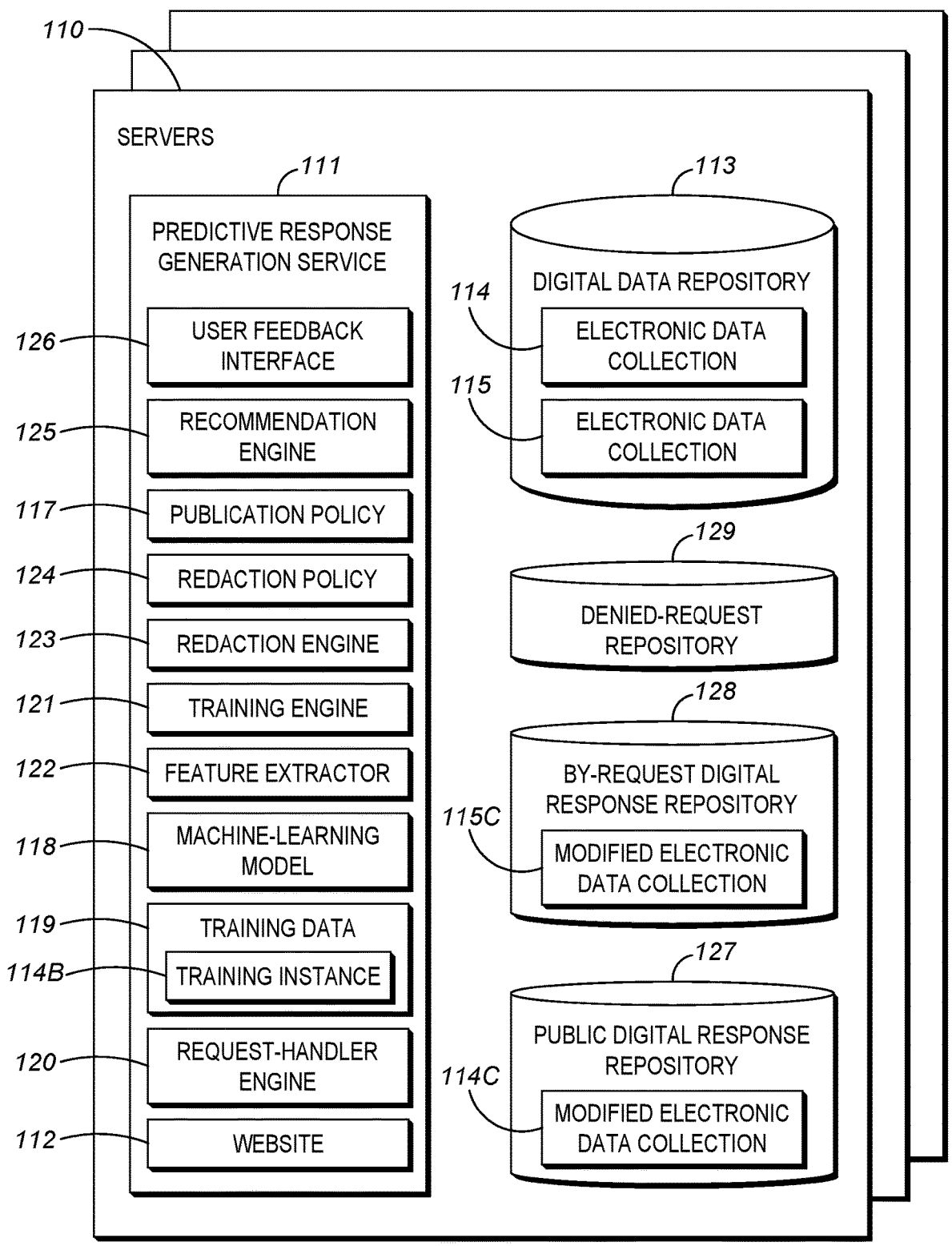
FIG. 1 illustrates a computing environment in which systems described in the present disclosure can operate, according to one illustrative and non-limiting example.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION OF THE INVENTION

Many governmental agencies, corporations, universities, and other entities store many different types of data for many different purposes. In some jurisdictions, there are laws that oblige certain types of entities to divulge certain types of data upon request. For example, the Freedom of Information Act (FOIA), included in 5 U.S.C. § 552, obliges federal agencies of the United States to disclose certain types of information upon request. At the state level within the United States, many state governments have passed similar laws (e.g., the Texas Public Information Act, the California Public Records Act, and the New York Freedom of Information Law). Similar laws apply in the United Kingdom (UK), Malaysia, and other jurisdictions. The General Data Protection Regulation (GDPR), which applies in European Union (EU) member states, gives people the right to request a copy of their personal data from "controllers" (entities that determine how that personal data is processed and for what purpose). The California Consumer Privacy Act (CCPA) provides a similar right in the state of California. Entities that fail to comply with such laws may be subject to costly fines and other penalties. Once a request is received under such a law, entities typically have a very limited amount of time in which to provide a response. Under the FOIA, for example, federal agencies have twenty working days to respond absent "unusual circumstances."

Even if the data that an entity may be obliged to divulge is stored in digital format, compiling a response to a request under an applicable law within a given timeframe may entail many challenges. One challenge is that the data to be compiled for the response may have been generated or recorded by many different devices and may be stored across many different locations. For example, some of the data that has to be compiled may have been generated or recorded by, or may be stored locally on, devices such as smartphones, body cameras, dashboard cameras, security cameras, two-way radios, flight recorders, Internet-of-Things (IoT) devices, digital fitness trackers, Global Positioning Systems (GPSs), voice recorders, and other devices. Other pertinent data may be stored in secure on-site data centers, cloud storage locations, laptop computers, desktop computers, flash drives, external hard drives, or other locations.

The process of identifying where the data is stored, accessing the data, and copying the data into a digital response may consume valuable time. If access privileges to pertinent data are restricted—a likely scenario for many government agencies—personnel in charge of compiling responses may be obliged to request access and wait for an administrator to approve. If pertinent data is stored on devices that are not immediately accessible via a digital network, personnel may be obliged to connect those devices to a network-connected computer via Universal Serial Bus (USB) or to remove secure digital (SD) cards from the devices and insert those SD cards into an SD card reader that is operably connected to a network-connected computer. In either scenario, valuable time is lost. Even if some of the locations where the data is stored are accessible via a digital network, larger files may take a long time to copy due to constraints on data transfer rates (e.g., due to bandwidth, connection speed, and connection reliability).

Another challenge is that data pertinent to the request may be stored across many different types of files, such as text files, image files, video files, audio files, and many other file types. Some of those files may have to be converted from proprietary formats to formats that are compatible with non-proprietary software that is publicly available at little or no cost. Converting between file formats—particularly formats for media such as video, audio, and images—is often a computationally intensive task that can tie up computer-processing resources and memory resources for an extended period of time when large files are involved. Furthermore, additional time may be consumed if files that are encrypted have to be decrypted, files that are compressed have to be decompressed (or vice versa), image files have to be processed via Optical Character Recognition (OCR), or audio files have to be transcribed into text files via voice-recognition technologies. Additional delay may result if data has to be exported from a database to form a file.

Yet another challenge is that responses to requests for information under one law may also be subject to additional laws or conditions that prohibit divulging certain types of information. For example, some laws may prohibit governmental agencies from divulging names of victims of certain crimes, names of offenders that are younger than a specified age, or names of witnesses who are protected under a witness-protection program. Other types of information, such as personal phone numbers, home addresses, and license plate numbers may also have to be redacted in some jurisdictions. Personally identifiable information (PII) may also have to be redacted. PII is defined in the U.S. Code of Federal Regulations (CFR) at 2 CFR § 200.79 as information that can be used to distinguish or trace an individual's identity, either alone or when combined with other personal or identifying information that is linked or linkable to a specific individual. Other jurisdictions define PII similarly. In the United States, the Criminal Justice Information Services (CJIS) Security Policy (which is hereby incorporated by reference) of the Federal Bureau of Investigation (FBI) sets strict rules regarding the circumstances under which PII, Criminal Justice Information (CJI), and Criminal History Record Information (CHRI) can be disclosed to the public. The Health Insurance Portability and Accountability Act (HIPAA) of 1996 (which is hereby incorporated by reference) prohibits certain entities from disclosing certain types of health data about individuals unless those individuals consent. Also, an entity may possess data that is subject to copyrights held by third parties and may therefore be prohibited from distributing the copyrighted data.

In some cases, it may also be prudent to redact information even if there is no law compelling redaction if disclosing that information might jeopardize an ongoing investigation into a crime for which a suspect is still at large. For example, the police may not want the public to know that they have identified a shoe print left by an unknown suspect at a crime scene, lest the suspect find out and dispose of the shoes that left the print.

For video and image files, faces of victims and other details may have to be blurred out. Graphic images (e.g., of crime scenes) may have to be edited or excluded from a response entirely. For audio files, some details (e.g., names or obscene language) may have to be bleeped out. Software for redacting (e.g., blurring and bleeping) may employ techniques in computer vision, speech recognition, sound manipulation, and natural-language processing that are computationally intensive and memory intensive. Hence, the process of ensuring compliance with laws that prohibit certain types of information from being disclosed consumes additional time and ties up additional computing resources.

In addition, there may be other exceptions to information-disclosure laws that give entities an option not to disclose certain types of data. The deliberative process privilege, for example, may allow government agencies to choose not to disclose pre-decisional and deliberative drafts of agency opinions in response to requests under the FOIA. It may be in an agency's best interest to refrain from disclosing such pre-decisional and deliberative drafts under the FOIA, but identifying those drafts may consume additional time and resources.

In practice, the challenges listed above (and other challenges) can make it very difficult for an entity to fulfill a legal obligation to respond to a request for information within a timeframe specified by law. These challenges are particularly acute for entities that use "big data" (e.g., terabytes, petabytes, or even exabytes of data that may accumulate at a rapid rate) because entities typically have finite computing resources with which to process data for inclusion in a response. Furthermore, entities typically have finite personnel time that can be dedicated to validate the output that those computing resources produce for inclusion in a response. Government agencies, for example, may have constraints on how many computing resources they can acquire and how many employees they can hire due to cost restrictions imposed by law.

However, in many scenarios, the number of requests to which an entity may be obliged to respond within a particular timeframe may be relatively unconstrained. In 2018, for example, the federal government of the United States collectively received more than 860,000 requests for information under the FOIA. If an entity is preparing many responses to requests concurrently, the entity's computing resources (and personnel) may be overextended and the entity may fail to finish preparing some of the responses before the deadline imposed by law passes. For entities such as the U.S. federal government, there is ample evidence that late responses are a common problem; a recent study of 33,000 requests under the FOIA showed that less than 39% of requests were answered by responses within 28 days (up to 8 non-business days may occur during a span of 20 business days).

Thus, there exists a need for an improved technical method, device, and system for predictive response generation to ensure timely compliance with information-disclosure laws. The systems described herein greatly increase the likelihood that entities will be able to respond in a timely fashion to requests for information. By employing machine-learning techniques and other technologies described herein, systems of the present disclosure can predict which data will be requested before such requests are actually received. By implementing functionality that is predictive rather than merely reactive, systems described herein effectively extend the amount of time that is available for computing resources to perform processing tasks on electronic data that will be included in a response. This results in a load-balancing effect over time because computing resources that might otherwise be idle during periods when few requests are concurrently being processed can be used to prepare response data preemptively for anticipated requests that have not yet been received. When a spike in the number of requests received occurs, the computing resources are less likely to be overwhelmed because much of the processing for requests that were anticipated will already have been performed.

Further advantages and features consistent with this disclosure will be set forth in the following detailed description with reference to the figures.

Referring now to the drawings, FIG. 1 illustrates a computing environment 100 in which systems described in the present disclosure can operate, according to one illustrative and non-limiting example. As shown, the computing environment 100 includes servers 110 that execute a predictive response-generation service 111. Persons of skill in the art will understand that any functionality attributed to the servers 110 or the blocks shown therein may be executed using computing resources such as processors, memory, network interconnects, and storage that are distributed across multiple sites (e.g., in a cloud computing platform) and are interconnected via a data center network, an enterprise network, a local area network (LAN), a virtual private network (VPN), or some other type of digital communication network (or a combination thereof). Persons of skill in the art will also understand that functionality attributed to the predictive-response generation service 111 or any block shown therein may also be performed by software modules that are separate from the predictive-response generation service 111 and are in merely in communication therewith without departing from the spirit and scope of this disclosure.

The predictive response-generation service 111 may host a website 112 for an entity (e.g., a government agency) that is obliged by law to provide information found in the entity's digital data repository 113 in response to requests. By predicting beforehand whether a request will be received for data pertinent to a topic, the predictive response-generation service 111 effectively extends the amount of time that is available for computing resources and personnel to prepare a response to the anticipated request because preparation of the response can begin before such a request is actually received. For clarity in illustration, the digital data repository 113 is shown as a single block. However, persons of skill in the art will recognize that the digital data repository 113 may be spread across many different geographical locations. The entity may provide the web site 112 as a conduit through which requests for information found in the digital data repository 113 can be digitally submitted. The entity may also allow requests to be submitted through other channels (e.g., email). The request-handler engine 120 represents a software construct that receives a request submitted through the web site 112 (or through other channels) and triggers the training engine 121 to create or update a training instance based on the request (as is described in greater detail below).

The digital data repository 113 comprises the electronic data collection 114, the electronic data collection 115, and other electronic data collections. Each data collection is associated with a topic. For example, if the entity is a law-enforcement agency, an incident to which the agency's officers were dispatched could be one example of a topic. Any digital information that the agency possesses about the incident, such as video files (e.g., from body cameras, dashboard cameras, security cameras, or smartphones), audio files (e.g., recorded conversations between dispatchers and officers), and text files (e.g., containing witness statements and incident reports) may be included in the data collection associated with the incident.

The predictive response-generation service 111 also includes a publication policy 117 and a redaction policy 124. The redaction policy 124 specifies types of information to redact from a data collection before the data collection is provided in response to a request for information about the topic associated with the data collection. The publication policy 117 specifies rules for the manner in which responses to requests are provided (e.g., both requests that have actually been received and requests that are anticipated). For example, the publication policy 117 may specify that responses that meet certain criteria are to be published online through the website 112 in a manner that is accessible to the general public (including members of the public who did not submit the requests that elicited the responses). The publication policy 117 may also specify that responses that do not meet the criteria to be made publicly available through the website 112 may still be provided upon request to requestors. In some cases, the publication policy 117 may specify that responses with certain characteristics are not to be published or even provided upon request (e.g., requests for such responses should be denied).

The predictive response-generation service 111 also includes a machine-learning model 118. The training engine 121 trains the machine-learning model 118 using the training data 119. The following example illustrates how the training data 119 may be generated. When a request for data concerning a specified topic is received, the request-handler engine 120 identifies the data collection associated with the topic. In this example, suppose the electronic data collection 114 is associated with the topic. The request-handler engine 120 triggers the training engine 121 to create a new training instance that will reflect the fact that a request for data pertinent to the topic has been received. In response, the training engine 121 signals the feature extractor 122 to extract a set of features for the electronic data collection 114. Upon receiving the extracted features from the feature extractor 122, the training engine 121 creates a training instance 114b. The training instance 114b comprises the features extracted for the electronic data collection 114 and also comprises a label (e.g., a score) that indicates a request was received for the topic associated with the electronic data collection 114. The training instance 114b is then added to the training data 119. Other training instances can be added to the training data 119 in a similar manner when other requests are received.

In addition, the training engine 121 can create training instances that represent data collections that are associated with topics for which no requests have been received even after a predefined amount of time has elapsed since those data collections were created (e.g., five years or ten years). These training instances are also created using features extracted by the feature extractor 122, but their labels (e.g., scores) reflect that no request has been received for the associated topics. When a request for a particular topic associated with a data collection is received for the first time, a training instance generated in this manner will be rendered obsolete. The training engine 121 removes the obsolete training instance from the training data 119 and adds a new training instance that indicates a request was received for the topic associated with the data collection (e.g., as described above with respect to the electronic data collection 114).

Depending on the nature of the entity served by the predictive response-generation service 111, the type of the machine-learning model 118, and the types of data stored in the digital data repository 113, there are many types of features that may be extracted by the feature extractor 122 to create a training instance based on a data collection. In one illustrative example, suppose that the entity is a law enforcement agency and the electronic data collection 114 comprises the electronic data that the agency possesses about an incident to which the agency's officers responded. In this example, the incident would serve as the topic associated with the electronic data collection 114 (e.g., the case file). One feature could represent an incident type (e.g., robbery, public disturbance, grand theft auto, trespassing, battery, assault, traffic violation, fraud, shoplifting, theft, burglary, larceny, arson, mass shooting, welfare check, etc.). It may be much more likely that the entity will receive requests for data related to some types of incidents (e.g., mass shootings) than others (e.g., welfare checks). Also, some features may represent outcomes resulting from the incident, such as the number of deaths, the number of injuries resulting in hospitalization, the number of responders dispatched to the incident, the duration of the incident, and the population density of the area where the event occurred (which may serve as a proxy estimate of the number of witnesses to the incident). Other outcomes that may take longer to determine, such as the number of lawsuits filed, the number of criminal convictions, and whether the incident was mentioned in traditional media (e.g., traditional media such as newspapers or news broadcasts) or social media (e.g., postings on social networking sites), may also be used as features when available.

Other features could represent the time of day that the incident occurred (e.g., morning, afternoon, night, or the hour of the day), the day of the week on which the incident occurred, the month in which the incident occurred, and whether the incident occurred on a holiday. Other features could represent a location where the incident took place (e.g., an address, a zip code, GPS coordinates, a city, a county, etc.). Still another feature could represent a currency value associated with property involved in the incident (e.g., the value of a chattel that was stolen, the amount of damage that was done to real property or automobiles involved in the incident, etc.). Additional features could represent whether a suspect was or is being prosecuted as a result of the incident, whether the suspect is a repeat offender, whether the suspect was on parole at the time of the incident, whether the suspect has any known affiliations with criminal entities (e.g., the mafia, a street gang, a drug-trafficking cartel, or a terrorist group), and whether force was used during the incident in an attempt to apprehend the suspect.

In this example, the feature extractor 122 may also cross-reference data sources outside of the digital data repository 113 to extract the features. For example, the feature extractor 122 may programmatically access search statistics provided by an Internet search engine (e.g., via an Application Programming Interface (API)) to determine an extent to which search terms associated with the type of the incident, the location of the incident, or a person involved in the incident are being included in search queries submitted to the Internet search engine. The feature extractor 122 may, for example, generate one feature that represents the total number of searches submitted to the Internet search engine that included those terms over a particular time interval. The feature extractor 122 may also generate a feature that represents a rate at which the total number of searches that included those terms is changing (e.g., increasing or decreasing).

The feature extractor 122 may also generate other features that depict whether a public figure (e.g., a politician or a celebrity) was a victim, a suspect, or a witness involved in the incident. To generate these features, the feature extractor 122 may compare the names of victims, witnesses, and suspects found in the electronic data collection 114 to internal or external databases or websites that store names of public figures. In the United States, for example, names of governors, legislators, and judges can generally be accessed online through governmental websites. Names of professional athletes can be extracted from rosters of professional sports teams posted on sports news websites. Names of social media influencers who have large online followings (e.g., greater than a threshold number of followers) can also be extracted from social media websites and applications. Names of famous actors and actresses can be extracted from cast listings provided on websites that provide movie reviews. Names of famous musicians can be extracted from websites that post lists of current popular songs and albums.

Persons of skill in the art will understand that feature values may be digitally represented a variety of ways. For example, a feature may be represented by an integer, a real number (e.g., decimal), an alphanumeric character, or a string. Features may also be discretized, normalized (e.g., converted to a scale from zero to one), or preprocessed in other ways to facilitate compatibility with the machine-learning model 118.

The predictive response-generation service 111 also includes a redaction engine 123. The redaction engine 123 represents a collection of software that is configured to redact sensitive data (e.g., to ensure compliance with laws that prohibit divulging certain types of information). When a request for data concerning the topic for the electronic data collection 114 is received, the request-handler engine 120 signals the redaction engine 123 to redact sensitive data from the electronic data collection 114 to generate the modified electronic data collection 114*c* in accordance with the redaction policy 124. Thus, the modified electronic data collection 114*c* is a redacted version of the electronic data collection 114 that is suitable to provide in response to the request. If the redaction policy 124 prohibits disclosing any of the data found in the electronic data collection 114, the modified electronic data collection 114*c* may be empty.

While the redaction engine 123 is shown as a single block in FIG. 1, persons of skill in the art will understand that the redaction engine 123 may represent a set of many different software modules that are configured to remove or obscure many different types of data. For example, suppose the electronic data collection 114 comprises video files, audio files, image files, and text files. One component of the redaction engine 123 may be configured to obscure faces, tattoos, license plate numbers, street names, and other elements depicted in video files or image files. Another component of the redaction engine 123 may be configured to distort voices (e.g., to ensure that voices are not recognizable) and bleep out names, graphic language, and other audible elements found in audio files. Another component of the redaction engine 123 may be configured to remove names and other PII depicted in text files.

In addition to performing redaction operations on the electronic data collection 114 to generate the modified electronic data collection 114*c*, the redaction engine 123 also generates a redaction-confidence score for the modified electronic data collection 114*c*. The redaction-confidence score is based on scoring rules found in the redaction policy 124 (e.g., as described in greater detail with respect to FIG. 3) and reflects a level of confidence that the redaction engine 123 succeeded at redacting the types of sensitive information specified in the redaction policy 124. If the redaction-confidence score meets a threshold, the redaction engine 123 may signal the user feedback interface 126 to present elements of the modified electronic data collection 114*c* that influenced the redaction-confidence score to a user (e.g., an administrator) for inspection. For example, suppose the redaction-confidence score is zero by default and the threshold condition is that a redaction-confidence score of 1 or higher triggers user inspection. In this illustrative non-limiting example, the user feedback interface 126 may present any element that caused the redaction-confidence score to be increased when one of the scoring rules was applied to that element.

Upon being presented with the elements of the modified electronic data collection 114c that influenced the redaction-confidence score, the user inspects the elements presented to verify whether the redaction engine 123 successfully redacted enough data for the modified electronic data collection 114c to comply with the redaction policy 124. If the user determines that additional redactions have to be made, the user feedback interface 126 may allow the user to identify additional data that should be redacted manually (e.g., by highlighting text to be redacted by using a cursor in a text file, tracing a boundary around an object to be blurred in an image file using an icon controlled by a computer mouse, or clicking on two points in a timeline for an audio file to identify a sound clip to distort). Upon receiving the user's input, the redaction engine 123 may perform any additional redactions suggested by the user. Once the user has inspected the elements presented via the user feedback interface 126 and any additional redactions suggested by the user have been completed, the user may indicate that the modified electronic data collection 114c is ready to be compared to the publication policy 117 to determine how (and whether) the modified electronic data collection 114c should be provided as a response.

Accordingly, the recommendation engine 125 compares the modified electronic data collection 114c to the publication policy 117 to determine an access privilege level for the modified data collection. If the modified electronic data collection 114c meets the criteria to be published online through the web site 112, the recommendation engine 125 may electronically transmit the modified electronic data collection 114c to the public digital response repository 127. The website 112 may provide public access to the public digital response repository 127. Furthermore, in one example, the recommendation engine 125 may also cause an electronic message to be sent to the requestor who submitted the request for data pertinent to the topic associated with the electronic data collection 114. The electronic message may inform the requestor that the requested information has been published on the web site 112 and provide a link through which the requestor may access the modified electronic data collection 114c. The recommendation engine 125 may also be configured to solicit user approval via the user feedback interface 126 before transmitting the modified electronic data collection 114c to the public digital response repository 127, if desired.

If the modified electronic data collection 114c does not meet the criteria to be published online through the web site 112, but does meet the criteria to be provided upon request to requestors, the recommendation engine 125 may cause the modified electronic data collection 114c to be electronically transmitted to the requestor. In addition, the recommendation engine 125 may add the modified electronic data collection 114c to the by-request digital response repository 128 so that the modified data collection can be provided immediately in response to any future requests for data pertinent to the topic associated with the electronic data collection 114 (although this scenario is not shown in FIG. 1). The recommendation engine 125 may also be configured to solicit user approval via the user feedback interface 126 before causing the modified electronic data collection 114c to be transmitted to the requestor, if desired.

If the modified electronic data collection 114c does not meet the criteria to be published online and does not meet the criteria to be provided upon request to requestors, the recommendation engine 125 causes an electronic message to be sent to the requestor. The electronic message informs the requestor that the request has been denied. The recommendation engine 125 may also add the request to the denied-request repository 129. The recommendation engine 125 may also be configured to solicit user approval via the user feedback interface 126 before causing the electronic message denying the request to be sent to the requestor.

The example above describes how the predictive response-generation service 111 may operate when a request is received. However, as discussed above, the software components of the redaction engine 123 for redacting data in accordance with the redaction policy 124 may involve techniques such as computer vision, speech recognition, sound manipulation, and natural-language processing that are computationally intensive and memory intensive. In addition, data stored in disparate locations may have to be compiled, converted into different formats (e.g., from an audio format to a text format), and subjected to other time-consuming processes.

Therefore, it is advantageous to predict whether requests pertinent to the topics associated with the data collections in the digital data repository 113 (e.g. electronic data collection 114 and electronic data collection 115) will be submitted to the predictive response-generation service 111 before those requests are actually received to ensure that the predictive response-generation service 111 has sufficient time to generate responses (e.g., more than the 20 working days that the FOIA provides for preparing a response once a request is received).

In order to predict requests before those requests are received, the predictive response-generation service 111 monitors the data collections in the digital data repository 113 (e.g., electronic data collection 114 and electronic data collection 115) to detect events that indicate that those data collections may be subject to a law that mandates disclosure upon request (e.g., the FOIA). The types of events monitored may vary depending on the entity and the applicable law. For example, suppose the applicable law states that data for an ongoing criminal investigation is not to be disclosed until the criminal investigation has concluded. In this example, suppose the data collections 114 and the electronic data collection 115 are case files for incidents in which crimes occurred. In this example, the predictive response-generation service 111 may monitor the electronic data collection 114 and the electronic data collection 115 to detect when a status of any of the data collections is changed from "open" to "closed." When the status of the electronic data collection 115 changes from "open" to "closed," the predictive response-generation service 111 signals the feature extractor 122 to extract a set of features for the electronic data collection 115. Those features are used to create an input instance that represents the electronic data collection 115. (Unlike a training instance, an input instance does not have a label.) Next, the predictive response-generation service 111 inputs the input instance into the machine-learning model 118. In response, the machine-learning model 118 outputs a request-prediction score (i.e., the predicted label) for the input instance. Persons of skill in the art will understand that the request prediction score may be quantitative (e.g., a probability ranging from zero to one), Boolean (e.g., "true" or "false"), or categorical (e.g., a value of "low," "medium," or "high").

If the request-prediction score indicates that the probability of receiving a request for data pertinent to the topic (the incident associated with the electronic data collection 115, in this example) meets a threshold probability, the predictive response-generation service 111 may proceed as if a request had already been received for data pertinent to the topic associated with the electronic data collection 115 in a manner similar to the description provided above with respect to the electronic data collection 114. For example, the predictive response-generation service 111 may signal the redaction engine 123 to redact sensitive data from the electronic data collection 115 to generate the modified electronic data collection 115c in accordance with the redaction policy 124. The redaction engine 123 generates the modified electronic data collection 115c accordingly and generates a redaction-confidence score for the modified electronic data collection 115c. If the redaction-confidence score for the modified electronic data collection 115c meets the threshold score, the user feedback interface 126 solicits user input to verify that the modified electronic data collection 115c complies with the redaction policy 124. Once the redaction engine 123 makes any additional redactions, the user indicates that the modified electronic data collection 115c is ready to be compared to the publication policy 117. Accordingly, the recommendation engine 125 compares the modified electronic data collection 115c to the publication policy 117 and transmits the modified electronic data collection 115c to either the public digital response repository 127 or the by-request digital response repository 128 (as shown in FIG. 1) so that the modified data collection can be provided immediately in response to any future requests for data pertinent to the topic associated with the electronic data collection 115.

Even if the modified electronic data collection 115c does not meet the criteria to be published online and does not meet the criteria to be provided upon request to requestors, the recommendation engine 125 can still store the modified electronic data collection 115c in the by-request digital response repository 128. This will allow the predictive response-generation service 111 to avoid repeating redaction operations on the electronic data collection 115 if an event detected at a future time (e.g., a case file being marked as closed) causes the modified electronic data collection 115c to meet the criteria to be published or provided upon request.

Note that the digital data repository 113, the denied-request repository 129, the by-request digital response repository 128, and the public digital response repository 127 may be stored on a combination of non-volatile storage elements (e.g., disc drives, removable memory cards or optical storage, solid state drives (SSDs), network attached storage (NAS), or a storage area-network (SAN)). Furthermore, data stored in the digital data repository 113, the denied-request repository 129, the by-request digital response repository 128, and the public digital response repository 127 may be stored in any combination of databases (e.g., relational or non-relational), flat files, or other formats.

FIG. 2 provides a table 200 that includes criteria that can be included in a publication policy (e.g., such as the publication policy 117 of FIG. 1), according to one illustrative and non-limiting example. Column 210 specifies criteria. Column 220 specifies which of the criteria specified in column 210 apply to modified data collections for responses that are to be published online. Column 230 specifies which of the criteria specified in column 210 apply to modified data collections for responses that are to be provided electronically upon request to requestors. Row 240 provides a title for the table 200. Row 250 serves as a header row for the table 200.

As shown in cell 211, one criterion may be that the redaction-confidence score for the modified data collection meets a threshold (e.g., is less than or equal to one) or that a user has manually verified that sufficient redaction has been performed on the modified data collection. As shown in cell 212, another criterion may be that the authenticity of the data included in the modified data collection has been marked as verified (e.g., that the sources of any data included in the modified data collection are considered reliable and that there is no indication of tampering). As shown in cell 213, another criterion may be that the sources for the data are subject to a jurisdiction over which the entity has authority. As shown in cell 214, another criterion may be that the sources of any data included in the modified data collection have been tagged as approved by the entity. As shown in cell 215, another criterion may be that victims, minors, witnesses, or vulnerable parties who are described by data in the modified data collection are not personally identifiable. As shown in cell 216, another criterion may be that a number of requests received by the entity for information pertinent to the topic of the modified data collection meets a threshold. For example, if the threshold is five, the criterion of cell 216 may specify that more than five requests for information pertinent to the topic have already been received by the entity. In other examples, other threshold number of requests may be used.

Persons of skill in the art will recognize that the criteria shown in table 200 are merely illustrative examples. The criteria used in a publication policy may vary widely without departing from the spirit and scope of this disclosure.

FIG. 3 provides a table 300 that includes scoring rules that could be included in a redaction policy (e.g., such as the redaction policy 124 of FIG. 1), according to one illustrative and non-limiting example. Column 310 specifies subheadings under which scoring rules may be grouped. Row 340 provides a title for the table 300. Row 350 serves as a header row for the table 300.

Column 320 specifies conditions for the scoring rules. Column 330 specifies amounts to add to a redaction-confidence score when the conditions specified in column 320 are met. For example, row 321 specifies a resolution level (1280 pixels by 720 pixels) for video files. If a video file included in a modified data collection has a resolution greater than or equal to 1280 pixels by 720 pixels, the rule in row 321 dictates that the redaction-confidence score for the modified data collection be increased by one. Any video files that have a resolution greater than or equal to 1280 pixels by 720 pixels can be designated (e.g., by the redaction engine 123 of FIG. 1) as elements that influenced the redaction-confidence score. As explained above with respect to FIG. 1, elements that influence the redaction-confidence score may be presented to a user for inspection (e.g., via the user feedback interface 126 of FIG. 1).

Row 322 specifies a downsampling ratio of three eighths for media files (e.g., video files, images files, and audio files). If a media file included in the modified data collection was downsampled to three eighths or less of the media file's initial size before redaction operations were applied, the rule in row 322 dictates that the redaction-confidence score for the modified data collection be increased by one. Media files in the modified data collection that have been downsampled enough for this rule to apply are designated as elements that influenced the redaction-confidence score and may be presented to a user for inspection.

Row 323 specifies several types of subject matter. If a media file or a text file in the modified data collection includes any of the subject matter specified in row 323, the rule of row 323 specifies that the redaction-confidence score for the modified data collection be increased by one. Files that contain any of the subject matter specified in row 323 are designated as elements that influenced the redaction-confidence score and may be presented to a user for inspection. For the purposes of this example, note that personally identifiable information (PII) is defined in the U.S. Code of Federal Regulations (CFR) at 2 CFR § 200.79 as information that can be used to distinguish or trace an individual's identity, either alone or when combined with other personal or identifying information that is linked or linkable to a specific individual.

Persons of skill in the art will understand that the scoring rules depicted in FIG. 3 are provided merely as illustrative examples. More or fewer scoring rules may be included in a redaction policy. Furthermore, the conditions specified by the rules may vary in different examples. Also, the amounts by which the redaction-confidence score is increased (or decreased) may vary in different examples.

Figure 4:
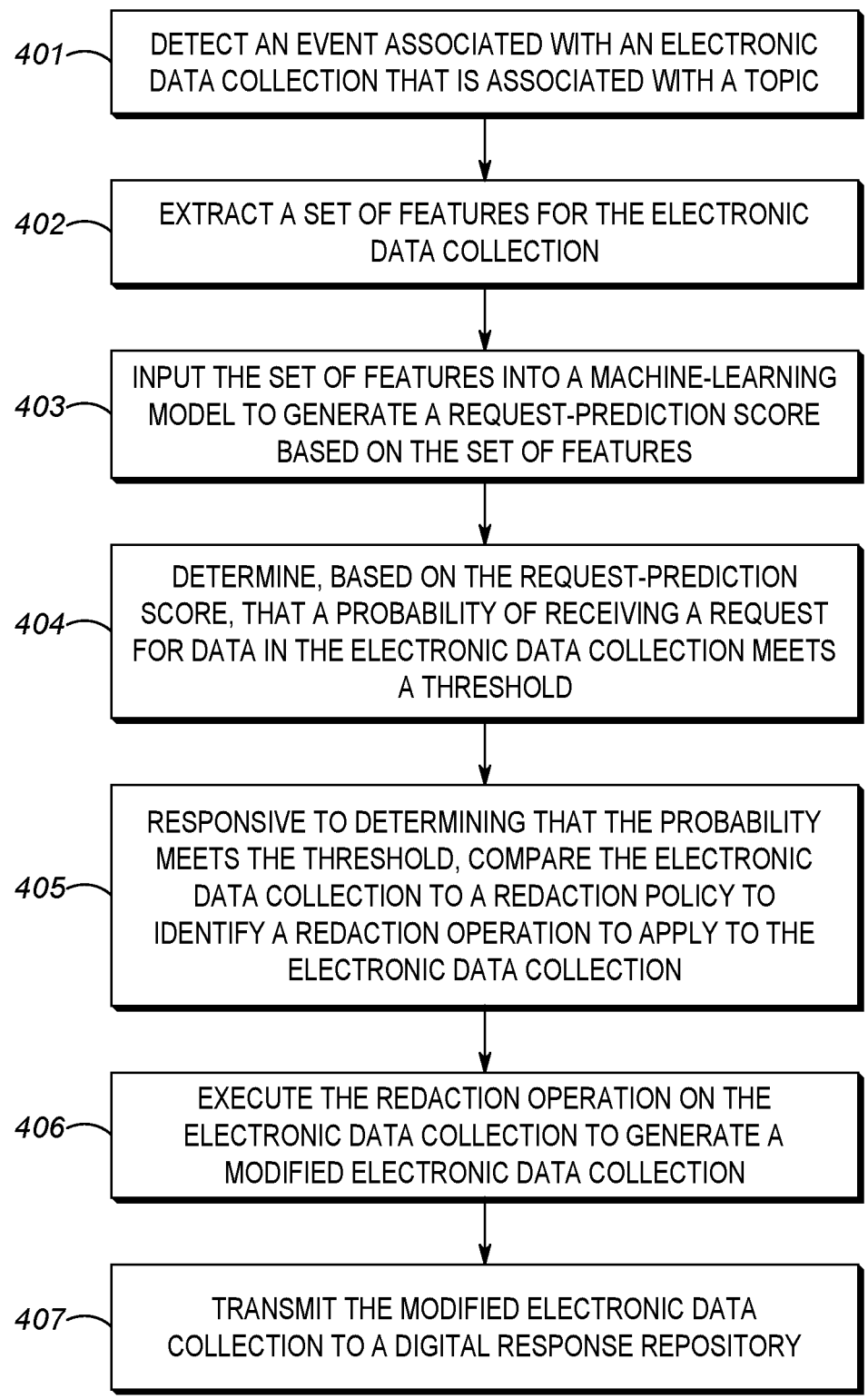
FIG. 4 illustrates functionality for a predictive response-generation service to perform for preparing automated responses to requests before those requests are actually received, according to one illustrative and non-limiting example.

FIG. 4 illustrates functionality 400 for a predictive response-generation service to perform for preparing automated responses to requests before those requests are actually received, according to one illustrative and non-limiting example. By predicting beforehand whether a request will be received for data pertinent to a topic, the predictive response-generation service effectively extends the amount of time that is available for computing resources and personnel to prepare a response to the anticipated request because preparation of the response can begin before such a request is actually received.

The functionality 400 does not have to be performed in the exact sequence shown. Also, various blocks may be performed in parallel rather than in sequence. Accordingly, the elements of the functionality 400 are referred to herein as "blocks" rather than "steps." The functionality 400 can be executed as instructions on a machine (e.g., by one or more processors), where the instructions are stored on a transitory or non-transitory computer-readable storage medium. While only seven blocks are shown in the functionality 400, the functionality 400 may comprise other actions described herein. Also, in some examples, some of the blocks shown in the functionality 400 may be omitted without departing from the spirit and scope of this disclosure.

As shown in block 401, the functionality 400 includes detecting an event associated with an electronic data collection that is associated with a topic. The event indicates that a law applicable to an entity in control of the electronic data collection may oblige the entity to disclose at least a portion of the electronic data collection in response to requests.

In one example, the topic is an incident in which one or more agents of the entity were involved. In this example, the electronic data collection may represent a case file for the incident. In this example, the event may be a change in a parameter that represents the status of the electronic data collection (e.g., a change from the value "open" to the value "closed"), a change in a parameter that represents a security level of the electronic data collection (e.g., a change from "classified" to "declassified"), a movement of the electronic data collection from a first namespace to a second namespace (e.g., where permissions for the second namespace allow read access for a broader class of users than permissions for the first namespace), or even the creation of the electronic data collection itself. Furthermore, the event may also be that a predefined period of time has elapsed (e.g., ten years) since a file in the electronic data collection has been changed (e.g., as indicated by time-stamps for the files in the electronic data collection). The event may also be a creation of a new law or a change in an existing law that specifies types of information that the entity is obliged to disclose upon request.

Depending on the applicable law and the entity's preferences, any one of these types of events may serve as the event detected in block 401. Furthermore, the event detected at block 401 may be a combination of two or more of the event types listed above. Persons of skill in the art will also understand that the event types described above are not an exhaustive list; other types of events that suggest the entity may be obliged to disclose the electronic data collection may be detected at block 401 without departing from the spirit and scope of this disclosure.

As shown in block 402, the functionality 400 includes extracting a set of features for the electronic data collection. As explained above with respect to the feature extractor 122 of FIG. 1, many different types of features may be extracted. For example, suppose the topic of the electronic data collection is an incident in which one or more agents of the entity were involved. In this example, some features that could be extracted may include an incident type, a time of the incident, a location where the incident took place, a currency value associated with property involved in the incident, and whether force was used during the incident. Also, some features may represent outcomes resulting from the incident, such as the number of deaths, the number of injuries resulting in hospitalization, the number of responders dispatched to the incident, the duration of the incident, and the population density of the area where the event occurred (which may serve as a proxy estimate of the number of witnesses to the incident). Other outcomes that may take longer to determine, such as the number of lawsuits filed, the number of criminal convictions, and whether the incident was mentioned in traditional media (e.g., traditional media such as newspapers or news broadcasts) or social media (e.g., postings on social networking sites), may also be used as features when available.

Additional features may describe the suspect by indicating the age of the suspect, the gender of the suspect, whether the suspect was or is being prosecuted as a result of the incident, whether the suspect is a repeat offender, whether the suspect was on parole at the time of the incident, and whether the suspect has any known affiliations with criminal entities. Features describing victims may also be extracted, such as the number of victims, the age of the youngest victim, the age of the oldest victim, the gender of a victim, and whether the victim is a member of the suspect's immediate family. Other features may indicate trends for Internet search terms associated with the type of the incident, the location of the incident, or a person involved in the incident. Another feature may indicate whether a famous person or some other type of public figure was involved in the incident (e.g., as a victim, a witness, or a suspect). The features may be stored in a data structure such as a vector, an array, a list, a stack, a queue, an object (e.g., in an object-oriented programming language), or some other type of data structure. The features may also be stored in as a comma separated values (CSV) file, an attribute relation file format (ARFF) file, a text (TXT) file, or some other type of file.

As shown in block 403, the functionality 400 includes inputting the features into a machine-learning model to generate a request-prediction score based on the features. The manner in which the machine-learning model uses the features to generate the request-prediction score may vary depending on the type of machine-learning model used.

There are many different types of inductive machine-learning models that can be used such as neural networks, support vector machines, Bayesian belief networks, association-rule models, decision trees, nearest-neighbor models (e.g., k-NN), regression models, deep belief networks, and Q-learning models. In addition, ensemble machine-learning models can be constructed from combinations of individual machine-learning models. Ensemble machine-learning models may be homogenous (i.e., including multiple member models of the same type) or non-homogenous (i.e., including multiple member models of different types). Within an ensemble machine-learning model, the member machine-learning models may all be trained using the same training data or may be trained using overlapping or non-overlapping subsets randomly selected from a larger set of training data. The Random-Forest model, for example, is an ensemble model in which multiple decision trees are generated using randomized subsets of input features and randomized subsets of training instances.

As shown in block 404, the functionality 400 includes determining, based on the request-prediction score, that a probability of receiving a request for data in the electronic data collection meets a threshold. For example, suppose the request-prediction score represents the probability as a value ranging from zero to one, inclusive. Also suppose the threshold is 0.5. In this example, the action of block 404 would comprise determining that the request-prediction score is greater than or equal to 0.5. In other examples, the request-prediction score may represent the probability in a different manner (e.g., as a value ranging from zero to one hundred, as a binary value, or some other type of value). However, regardless of how the request-prediction score is encoded in any particular implementation, the request-prediction score indicates that the probability meets the threshold in block 404.

As shown in block 405, the functionality 400 includes, responsive to determining that the probability meets the threshold, comparing the electronic data collection to a redaction policy to identify a redaction operation to apply to the electronic data collection. As discussed above with respect to the redaction engine 123 of FIG. 1, the electronic data collection may comprise video files, audio files, image files, text files, or any combination thereof. The redaction operation may comprise obscuring faces, tattoos, license plate numbers, street names, and other elements depicted in video files or image files. The redaction operation may also comprise distorting voices, bleeping out names and graphic language, and altering other audible elements found in audio files. The redaction operation may also comprise removing or obscuring names, offensive language, or other sensitive text found in text files.

As shown in block 406, the functionality 400 includes executing the redaction operation on the electronic data collection to generate a modified electronic data collection. The modified electronic data collection is a redacted version of the electronic data collection.

In some examples, the functionality 400 may also include determining a redaction-confidence score for the modified electronic data collection based on scoring rules included in the redaction policy. If the redaction-confidence score meets a second threshold, an element that influenced the redaction-confidence score is presented to a user via an electronic display. User input received via an input/output (I/O) device can indicate that the modified electronic data collection complies with the redaction policy. The user input may also indicate additional redaction operations to be performed. In some examples, the user may perform the redactions manually via the I/O device and the electronic display.

As shown in block 407, the functionality 400 includes transmitting the modified electronic data collection to a digital response repository. The functionality 400 may also include, prior to transmitting the modified electronic data collection to the digital response repository, comparing the modified electronic data collection to a publication policy to determine an access privilege level for the modified electronic data collection. If the digital response repository matches the access privilege level, the functionality 400 may also include selecting the digital response repository as a location where the modified electronic data collection is to be stored. The access privilege level indicates an extent to which the publication policy permits the modified electronic data collection to be made public. For example, if the modified electronic data collection meets criteria specified in the publication policy to be made accessible to members of the public (including members of the public who have not submitted requests pertinent to the topic), a public digital response repository (e.g., the public digital response repository 127 described with respect to FIG. 1) matches the access privilege level of the modified collection. In another example, suppose the modified electronic data collection does not meet the criteria to be made available to non-requestor members of the public, but does meet the criteria to be made available to requestor members of the public (i.e., parties that actually submit requests). In this example, a by-request digital response repository (e.g., the by-request digital response repository 128 described with respect to FIG. 1) matches the access privilege level of the modified collection.

The functionality 400 may also include receiving an electronic request (e.g., via a web site) for information associated with the topic and transmitting the modified electronic data collection via a network (e.g., the Internet) in response to the request. If the modified electronic data collection meets criteria specified in the publication policy to be made accessible to members of the public (including members of the public who have not submitted requests pertinent to the topic), the transmittal may occur when the requestor visits a website through which the public digital response repository can be accessed. If the modified electronic data collection does not meet the criteria to be made available to non-requestor members of the public, but does meet the criteria to be made available to requestor members of the public, the transmittal may occur when the modified electronic data collection is sent directly to the requestor without being posted on a website.

The functionality 400 may also include receiving an electronic request (e.g., via a web site) for information associated with a second topic. If it is determined that the digital response repository does not contain a redacted version of a second data collection associated with the second topic, the functionality 400 may also include extracting a second set of features for the second data collection, generating a training instance that comprises the second set of features and a label that indicates a request was received for the second topic, and training the machine-learning model using the training instance.

Figure 5:
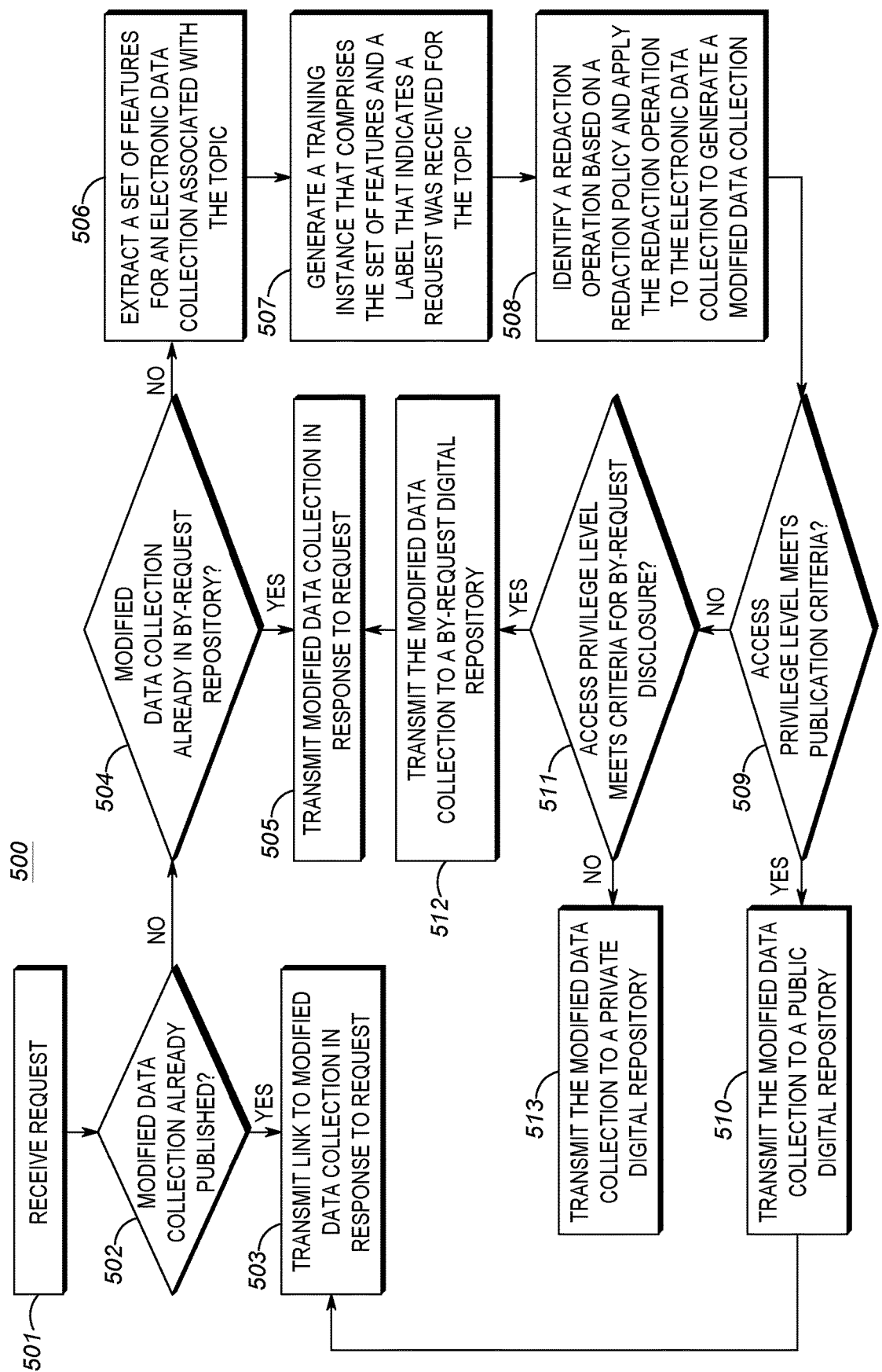
FIG. 5 illustrates functionality for a predictive response-generation service to perform when electronic requests are received, according to one illustrative and non-limiting example.

While FIG. 4 illustrates actions that the predictive response-generation service may take to predict whether a request will be received for data related to a topic and to prepare a response to an anticipated request that has not yet been received, FIG. 5 illustrates actions that the predictive response-generation service may take to fulfill a predicted request or actual request before or after a request is actually received.

FIG. 5 illustrates functionality 500 for a predictive response-generation service to perform after electronic requests are received, according to one illustrative and non-limiting example. The functionality 500 does not have to be performed in any of the exact sequences shown. Also, various blocks may be performed in parallel rather than in sequence. Accordingly, the elements of the functionality 500 are referred to herein as "blocks" rather than "steps." The functionality 500 can be executed as instructions on a machine (e.g., by one or more processors), where the instructions are stored on a transitory or non-transitory computer-readable storage medium. While only thirteen blocks are shown in the functionality 500, the functionality 500 may comprise other actions described herein. Also, in some examples, some of the blocks shown in the functionality 500 may be omitted without departing from the spirit and scope of this disclosure.

At block 501, an electronic request is received for data associated with a topic. At block 502, the predictive response-generation service determines whether a modified electronic data collection associated with the topic has already been generated and is available in a public digital response repository (e.g., as described above with respect to FIG. 4). If so, at block 503, the predictive response-generation service electronically transmits a link through which the modified electronic data collection can be accessed in response to the request. Otherwise, the flow of the functionality 500 proceeds to block 504.

At block 504, the predictive response-generation service determines whether a modified electronic data collection associated with the topic has already been generated and is available in a by-request digital response repository (e.g., as described above with respect to FIG. 4). If so, at block 505, the predictive response-generation service transmits the modified electronic data collection in response to the request. Otherwise, the flow of functionality 500 proceeds to block 506.

Thus, as shown in blocks 501-505, if the predictive response-generation service correctly predicted that a request for data associated with the topic would be received and prepared a modified electronic data collection beforehand (e.g., as described above with respect to FIG. 4), the modified electronic data collection can be sent in response to the request without delay—meaning that a response could be provided easily within a time constraint imposed by law. However, if the request received was not predicted beforehand, the predictive response-generation service can proceed as shown in blocks 506-513 to prepare a response and to train the machine-learning model that is used to predict whether requests will be received.

At block 506, the predictive response-generation service extracts a set of features for an electronic data collection associated with the topic. At block 507, the predictive response-generation service generates a training instance that comprises the set of features and a label that indicates a request was received for the topic. The training instance is added to a corpus of training data for a machine-learning model.

At block 508, the predictive response-generation service identifies a redaction operation based on a redaction policy and applies the redaction operation to the electronic data collection to generate a modified electronic data collection.

At block 509, the predictive response-generation service compares the modified electronic data collection to a publication policy to determine an access privilege level for the modified electronic data collection. If the access privilege level of the modified electronic data collection meets criteria for publication specified in the publication policy, the predictive response-generation service transmits the modified electronic data collection to a public digital response repository at block 510 and electronically transmits a link through which the modified electronic data collection can be accessed in response to the request at block 503. Otherwise, the flow of functionality 500 proceeds to block 511.

At block 511, the predictive response-generation service determines whether the modified electronic data collection meets criteria for by-request disclosure specified in the publication policy. If so, the predictive response-generation service transmits the modified electronic data collection to a by-request digital response repository at block 512 and transmits the modified electronic data collection in response to the request at block 505. Otherwise, at block 513, the predictive response-generation service stores the modified electronic data collection in a private digital data repository that is neither publicly accessible nor accessible upon request to parties outside of the entity that controls the modified electronic data collection. At block 514, the predictive response-generation service transmits an electronic message in response to the request to explain that the request has been denied.

Figure 6:
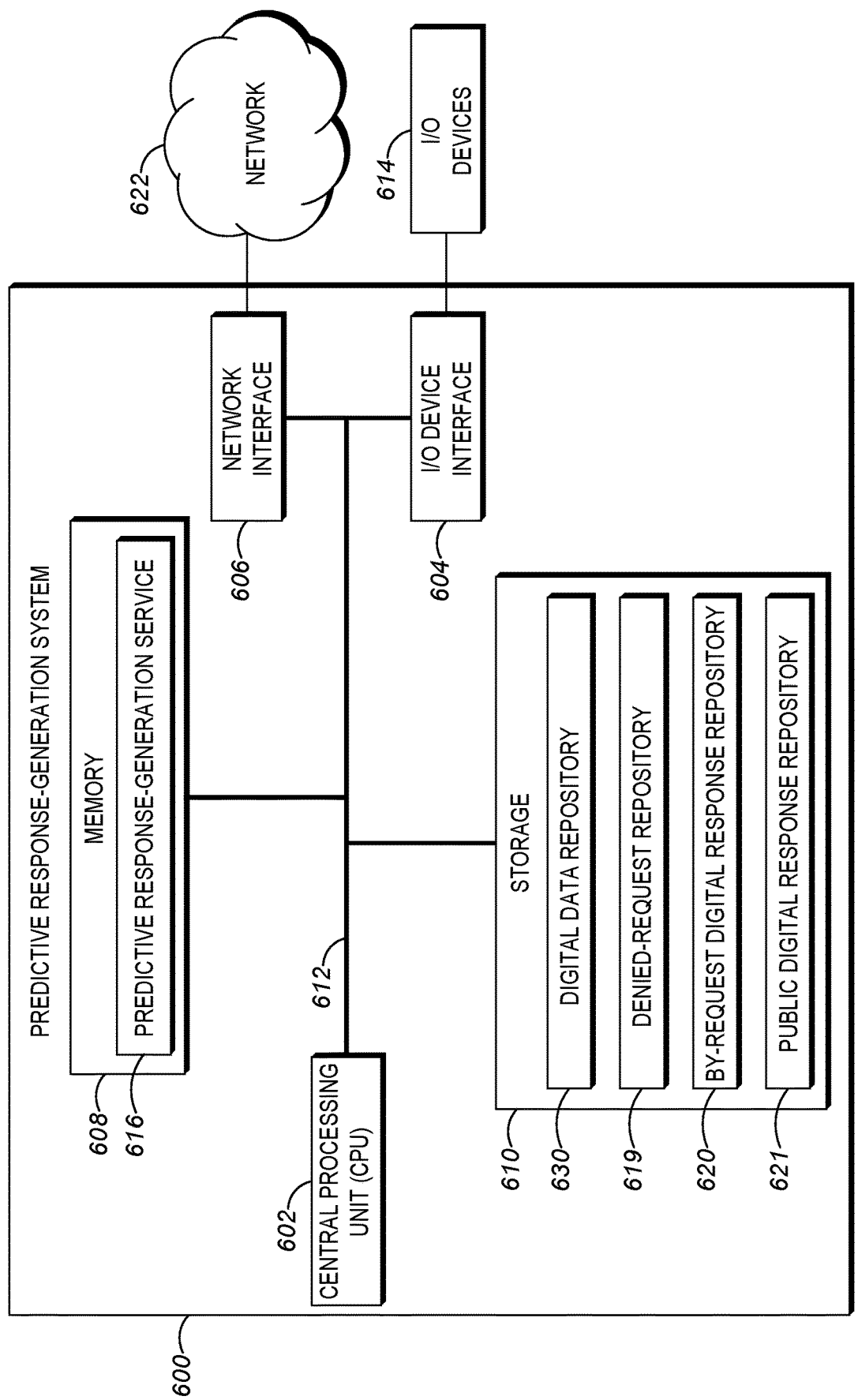
FIG. 6 illustrates a predictive response-generation system that predicts whether requests will be received for information pertinent to topics associated with data collections, according to one illustrative and non-limiting example.

FIG. 6 illustrates a predictive response-generation system 600 that predicts whether requests will be received for information pertinent to topics associated with data collections, according to one illustrative and non-limiting example. As shown, the predictive response-generation system 600 comprises a central processing unit (CPU) 602 and an input/output (I/O) device interface 604 that allows I/O devices 614 (e.g., a keyboard, a mouse, or a touch screen) to be connected to the predictive response-generation system 600. The predictive response-generation system 600 also comprises a network interface 606, a memory 608, storage 610, and an interconnect 612 (e.g., a common data and address bus).

The CPU 602 may retrieve application data and programming instructions from the memory 608 and execute those programming instructions. The interconnect 612 provides a digital transmission path through which the CPU 602, the I/O device interface 604, the network interface 606, the memory 608, and the storage 610 can transmit data and programming instructions amongst each other. While the CPU 602 is shown as a single block, persons of skill on the art will understand that the CPU may represent a single CPU, a plurality of CPUs, a CPU with a plurality of processing cores, or some other combination of processor hardware.

The memory 608 may be random access memory (RAM) and the storage 610 may be non-volatile storage. Persons of skill in the art will understand that the storage 610 may comprise any combination of internal or external storage devices (e.g., disc drives, removable memory cards or optical storage, solid state drives (SSDs), network attached storage (NAS), or a storage area-network (SAN)). The digital data repository 630, the denied-request repository 619, the by-request digital response repository 620, and the public digital response repository 621 may be located in the storage 610.

As shown, the predictive response-generation service 616 may be stored in the memory 608 and may function as described with respect to FIGS. 1-5. Requests for information may be submitted to the predictive response-generation service 616 via the network 622 (e.g., the Internet or another network). When a request is received, the predictive response-generation service 616 can determine if a modified electronic data collection that matches the request is already stored in the by-request digital response repository 620 or in the public digital response repository 621. If so, the predictive response-generation service 616 can transmit the modified electronic data collection or a link thereto in response to the request via the network 622.

If no matching modified electronic data collection has previously been generated, the predictive response-generation service 616 can generate a modified electronic data collection by performing redaction operations dictated by a redaction policy on a data collection associated with a topic specified by the request. If a redaction-confidence score meets a threshold, the predictive response-generation service 616 may also solicit user feedback (e.g., via the I/O devices 614) to verify that the modified electronic data collection complies with the redaction policy. The predictive response-generation service 616 may also determine an access privilege level for the modified electronic data collection based on a publication policy. Depending on the access privilege level for the modified electronic data collection, the predictive response-generation service 616 may store the modified electronic data collection in the by-request digital response repository 620 or the public digital response repository 621. The predictive response-generation service 616 can send the modified electronic data collection or a link thereto in response to the request. However, if the access privilege level dictates the request should be denied outright, the request can be stored in the denied-request repository 619. The predictive response-generation service 616 may also generate a training instance to reflect that a request was received for the topic associated with the data collection and use the training instance to train a machine-learning model for predicting future requests that are yet to be received.

Examples are herein described with reference to flowchart illustrations and/or block diagrams of methods, apparatuses (e.g., systems), and computer program products. Persons of skill in the art will understand that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein do not, in some examples, have to be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot effect changes to digital media files, among other features and functions set forth herein).

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not have to include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1%, and in another example within 0.5%. The term "one of," without a more limiting modifier such as "only one of," and when applied herein to two or more subsequently defined options such as "one of A and B," should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, an electrical signal, or a mechanical element depending on the particular context.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions or in one or more application specific integrated circuits (ASICs) in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. In the context of this document, a computer-usable or computer-readable medium may be any medium that can contain, store, communicate, propagate, or transport the program for use by, or in connection with, the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs without undue experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages such as the "C" programming language or similar programming languages. The program code may execute entirely on a computer, partly on the computer, as a stand-alone software package, partly on the computer and partly on a remote computer or server, or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Examples

The following additional examples are included below to highlight several aspects of the systems and processes described herein. However, the scope of the disclosure is not limited to these additional examples or the other examples described herein.

Example 1 includes a system comprising: one or more processors; and a memory containing instructions thereon which, when executed by the one or more processors, cause the processors to perform a set of actions comprising: detecting an event associated with an electronic data collection that is associated with a topic, wherein the event indicates that a law applicable to an entity in control of the electronic data collection may oblige the entity to disclose at least a portion of the electronic data collection in response to requests; extracting a set of features for the electronic data collection; inputting the set of features into a machine-learning model to generate a request-prediction score based on the set of features; determining, based on the request-prediction score, that a probability of receiving a request for data in the electronic data collection meets a threshold; responsive to determining that the probability meets the threshold, comparing the electronic data collection to a redaction policy to identify a redaction operation to apply to the electronic data collection; executing the redaction operation on the electronic data collection to generate a modified electronic data collection; and transmitting the modified electronic data collection to a digital response repository.

Example 2 includes the system of example 1, wherein the set of actions further comprises: receiving, via a website, an electronic request for information associated with the topic; and transmitting the modified electronic data collection via a network in response to the electronic request.

Example 3 includes the system of example 1 or 2, wherein the set of actions further comprises: prior to transmitting the modified electronic data collection to the digital response repository, comparing the modified electronic data collection to a publication policy to determine an access privilege level for the modified electronic data collection; and upon verifying that the digital response repository matches the access privilege level, selecting the digital response repository as a location where the modified electronic data collection is to be stored.

Example 4 includes the system of example 1, 2, or 3, wherein the set of actions further comprises: determining a redaction-confidence score for the modified electronic data collection based on scoring rules included in the redaction policy; upon detecting that the redaction-confidence score meets a second threshold, presenting an element that influenced the redaction-confidence score to a user via an electronic display; and receiving, via an input/output (I/O)

device, user input indicating that the modified electronic data collection complies with the redaction policy.

Example 5 includes the system of example 1, 2, 3, or 4, wherein the set of actions further comprises: receiving, via a website, an electronic request for information associated with a second topic; upon determining that the digital response repository does not contain a redacted version of a second electronic data collection associated with the second topic, extracting a second set of features for the second electronic data collection; generating a training instance that comprises the second set of features and a label that indicates the electronic request was received for the second topic; and training the machine-learning model using the training instance.

Example 6 includes the system of example 1, 2, 3, 4, or 5, wherein the topic is an incident, and wherein the set of features comprises features that indicate one or more of the following: an incident type, a time when the incident occurred, a location where the incident occurred, a currency value of property involved in the incident, or whether force was used by agents of the entity during the incident.

Example 7 includes the system of example 1, 2, 3, 4, 5, or 6, wherein the event comprises one or more of the following: a change in a first parameter that represents a status of the electronic data collection, a change in a second parameter that represents a security level of the electronic data collection, or a movement of the electronic data collection from a first namespace to a second namespace.

Example 8 includes a method comprising: detecting an event associated with an electronic data collection that is associated with a topic, wherein the event indicates that a law applicable to an entity in control of the electronic data collection may oblige the entity to disclose at least a portion of the electronic data collection in response to requests; extracting a set of features for the electronic data collection; inputting the set of features into a machine-learning model to generate a request-prediction score based on the set of features; determining, based on the request-prediction score, that a probability of receiving a request for data in the electronic data collection meets a threshold; responsive to determining that the probability meets the threshold, comparing the electronic data collection to a redaction policy to identify a redaction operation to apply to the electronic data collection; executing the redaction operation on the electronic data collection to generate a modified electronic data collection; and transmitting the modified electronic data collection to a digital response repository.

Example 9 includes the method of example 8, further comprising: receiving, via a website, an electronic request for information associated with the topic; and transmitting the modified electronic data collection via a network in response to the electronic request.

Example 10 includes the method of example 8 or 9, further comprising, prior to transmitting the modified electronic data collection to the digital response repository: comparing the modified electronic data collection to a publication policy to determine an access privilege level for the modified electronic data collection; and upon verifying that the digital response repository matches the access privilege level, selecting the digital response repository as a location where the modified electronic data collection is to be stored.

Example 11 includes the method of example 8, 9, or 10, further comprising: determining a redaction-confidence score for the modified electronic data collection based on scoring rules included in the redaction policy; upon detecting that the redaction-confidence score meets a second threshold, presenting an element that influenced the redaction-confidence score to a user via an electronic display; and receiving, via an input/output (I/O) device, user input indicating that the modified electronic data collection complies with the redaction policy.

Example 12 includes the method of example 8, 9, 10, or 11, further comprising: receiving, via a website, an electronic request for information associated with a second topic; upon determining that the digital response repository does not contain a redacted version of a second data collection associated with the second topic, extracting a second set of features for the second data collection; generating a training instance that comprises the second set of features and a label that indicates a request was received for the second topic; and training the machine-learning model using the training instance.

Example 13 includes the method of example 8, 9, 10, 11, or 12, wherein the topic is an incident, and wherein the set of features comprises features that indicate one or more of the following: an incident type, a time when the incident occurred, a location where the incident occurred, a currency value of property involved in the incident, or whether force was used by agents of the entity during the incident.

Example 14 includes the method of example 8, 9, 10, 11, 12, or 13, wherein the event comprises one or more of the following: a change in a first parameter that represents a status of the electronic data collection, a change in a second parameter that represents a security level of the electronic data collection, or a movement of the electronic data collection from a first namespace to a second namespace.

Example 15 includes a non-transitory computer-readable storage medium containing instructions that, when executed by one or more processors, perform a set of actions comprising: detecting an event associated with an electronic data collection that is associated with a topic, wherein the event indicates that a law applicable to an entity in control of the electronic data collection may oblige the entity to disclose at least a portion of the electronic data collection in response to requests; extracting a set of features for the electronic data collection; inputting the set of features into a machine-learning model to generate a request-prediction score based on the set of features; determining, based on the request-prediction score, that a probability of receiving a request for data in the electronic data collection meets a threshold; responsive to determining that the probability meets the threshold, comparing the electronic data collection to a redaction policy to identify a redaction operation to apply to the electronic data collection; executing the redaction operation on the electronic data collection to generate a modified electronic data collection; and transmitting the modified electronic data collection to a digital response repository.

Example 16 includes the non-transitory computer-readable storage medium of example 15, wherein the set of actions further comprises: receiving, via a website, an electronic request for information associated with the topic; and transmitting the modified electronic data collection via a network in response to the electronic request.

Example 17 includes the non-transitory computer-readable storage medium of example 15 or 16, wherein the set of actions further comprises: prior to transmitting the modified electronic data collection to the digital response repository, comparing the modified electronic data collection to a publication policy to determine an access privilege level for the modified electronic data collection; and upon verifying that the digital response repository matches the access privilege level, selecting the digital response repository as a location where the modified electronic data collection is to be stored.

Example 18 includes the non-transitory computer-readable storage medium of example 15, 16, or 17, wherein the set of actions further comprises: determining a redaction-confidence score for the modified electronic data collection based on scoring rules included in the redaction policy; upon detecting that the redaction-confidence score meets a second threshold, presenting an element that influenced the redaction-confidence score to a user via an electronic display; and receiving, via an input/output (I/O) device, user input indicating that the modified electronic data collection complies with the redaction policy.

Example 19 includes the non-transitory computer-readable storage medium of example 15, 16, 17, or 18, wherein the set of actions further comprises: receiving, via a website, an electronic request for information associated with a second topic; upon determining that the digital response repository does not contain a redacted version of a second data collection associated with the second topic, extracting a second set of features for the second data collection; generating a training instance that comprises the second set of features and a label that indicates a request was received for the second topic; and training the machine-learning model using the training instance.

Example 20 includes the non-transitory computer-readable storage medium of example 15, 16, 17, 18, or 19, wherein the topic is an incident, and wherein the set of features comprises features that indicate one or more of the following: an incident type, a time when the incident occurred, a location where the incident occurred, a currency value of property involved in the incident, or whether force was used by agents of the entity during the incident.

Example 21 includes the non-transitory computer-readable storage medium of example 15, 16, 17, 18, 19, or 20, wherein the event comprises one or more of the following: a change in a first parameter that represents a status of the electronic data collection, a change in a second parameter that represents a security level of the electronic data collection, or a movement of the electronic data collection from a first namespace to a second namespace.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
one or more processors; and
a memory containing instructions thereon which, when executed by the one or more processors, cause the processors to perform a set of actions comprising:
detecting an event associated with an electronic data collection that is associated with a topic, wherein the event indicates that a law applicable to an entity in control of the electronic data collection may oblige the entity to disclose at least a portion of the electronic data collection in response to requests;
extracting a set of features for the electronic data collection;
inputting the set of features into a machine-learning model to generate a request-prediction score based on the set of features;
determining, based on the request-prediction score, that a probability of receiving a request for data in the electronic data collection meets a threshold, wherein the request-prediction score indicates the probability of receiving the request for data in the electronic data collection that is associated with the topic and which obliges the entity to disclose pertinent data with respect to the topic;
responsive to determining that the probability meets the threshold, comparing the electronic data collection to a redaction policy to identify a redaction operation to apply to the electronic data collection;
executing the redaction operation on the electronic data collection to generate a modified electronic data collection; and
transmitting the modified electronic data collection to a digital response repository.

2. The system of claim 1, wherein the set of actions further comprises:
receiving, via a website, an electronic request for information associated with the topic; and
transmitting the modified electronic data collection via a network in response to the electronic request.

3. The system of claim 1, wherein the set of actions further comprises:
prior to transmitting the modified electronic data collection to the digital response repository, comparing the modified electronic data collection to a publication policy to determine an access privilege level for the modified electronic data collection; and
upon verifying that the digital response repository matches the access privilege level, selecting the digital response repository as a location where the modified electronic data collection is to be stored.

4. The system of claim 1, wherein the set of actions further comprises:
determining a redaction-confidence score for the modified electronic data collection based on scoring rules included in the redaction policy;
upon detecting that the redaction-confidence score meets a second threshold, presenting an element that influenced the redaction-confidence score to a user via an electronic display; and
receiving, via an input/output (I/O) device, user input indicating that the modified electronic data collection complies with the redaction policy.

5. The system of claim 1, wherein the set of actions further comprises:
receiving, via a website, an electronic request for information associated with a second topic;
upon determining that the digital response repository does not contain a redacted version of a second electronic data collection associated with the second topic, extracting a second set of features for the second electronic data collection;
generating a training instance that comprises the second set of features and a label that indicates the electronic request was received for the second topic; and
training the machine-learning model using the training instance.

6. The system of claim 1, wherein the topic is an incident, and wherein the set of features comprises features that indicate one or more of the following: an incident type, a time when the incident occurred, a location where the incident occurred, a currency value of property involved in the incident, or whether force was used by agents of the entity during the incident.

7. The system of claim 1, wherein the event comprises one or more of the following: a change in a first parameter that represents a status of the electronic data collection, a change in a second parameter that represents a security level of the electronic data collection, or a movement of the electronic data collection from a first namespace to a second namespace.

8. A method comprising:
detecting an event associated with an electronic data collection that is associated with a topic, wherein the event indicates that a law applicable to an entity in control of the electronic data collection may oblige the entity to disclose at least a portion of the electronic data collection in response to requests;
extracting a set of features for the electronic data collection;
inputting the set of features into a machine-learning model to generate a request-prediction score based on the set of features;
determining, based on the request-prediction score, that a probability of receiving a request for data in the electronic data collection meets a threshold, wherein the request-prediction score indicates the probability of receiving the request for data in the electronic data collection that is associated with the topic and which obliges the entity to disclose pertinent data with respect to the topic;
responsive to determining that the probability meets the threshold, comparing the electronic data collection to a redaction policy to identify a redaction operation to apply to the electronic data collection;
executing the redaction operation on the electronic data collection to generate a modified electronic data collection; and
transmitting the modified electronic data collection to a digital response repository.

9. The method of claim 8, further comprising:
receiving, via a website, an electronic request for information associated with the topic; and
transmitting the modified electronic data collection via a network in response to the electronic request.

10. The method of claim 8, further comprising, prior to transmitting the modified electronic data collection to the digital response repository:
comparing the modified electronic data collection to a publication policy to determine an access privilege level for the modified electronic data collection; and
upon verifying that the digital response repository matches the access privilege level, selecting the digital response repository as a location where the modified electronic data collection is to be stored.

11. The method of claim 8, further comprising:
determining a redaction-confidence score for the modified electronic data collection based on scoring rules included in the redaction policy;
upon detecting that the redaction-confidence score meets a second threshold, presenting an element that influenced the redaction-confidence score to a user via an electronic display; and
receiving, via an input/output (I/O) device, user input indicating that the modified electronic data collection complies with the redaction policy.

12. The method of claim 8, further comprising:
receiving, via a website, an electronic request for information associated with a second topic;
upon determining that the digital response repository does not contain a redacted version of a second electronic data collection associated with the second topic, extracting a second set of features for the second electronic data collection;
generating a training instance that comprises the second set of features and a label that indicates the electronic request was received for the second topic; and
training the machine-learning model using the training instance.

13. The method of claim 8, wherein the topic is an incident, and wherein the set of features comprises features that indicate one or more of the following: an incident type, a time when the incident occurred, a location where the incident occurred, a currency value of property involved in the incident, or whether force was used by agents of the entity during the incident.

14. The method of claim 8, wherein the event comprises one or more of the following: a change in a first parameter that represents a status of the electronic data collection, a change in a second parameter that represents a security level of the electronic data collection, or a movement of the electronic data collection from a first namespace to a second namespace.

15. A non-transitory computer-readable storage medium containing instructions that, when executed by one or more processors, perform a set of actions comprising:
detecting an event associated with an electronic data collection that is associated with a topic, wherein the event indicates that a law applicable to an entity in control of the electronic data collection may oblige the entity to disclose at least a portion of the electronic data collection in response to requests;
extracting a set of features for the electronic data collection;
inputting the set of features into a machine-learning model to generate a request-prediction score based on the set of features;
determining, based on the request-prediction score, that a probability of receiving a request for data in the electronic data collection meets a threshold, wherein the request-prediction score indicates the probability of receiving the request for data in the electronic data collection that is associated with the topic and which obliges the entity to disclose pertinent data with respect to the topic;
responsive to determining that the probability meets the threshold, comparing the electronic data collection to a redaction policy to identify a redaction operation to apply to the electronic data collection;
executing the redaction operation on the electronic data collection to generate a modified electronic data collection; and
transmitting the modified electronic data collection to a digital response repository.

16. The non-transitory computer-readable storage medium of claim 15, wherein the set of actions further comprises:
receiving, via a website, an electronic request for information associated with the topic; and transmitting the modified electronic data collection via a network in response to the electronic request.

17. The non-transitory computer-readable storage medium of claim 15, wherein the set of actions further comprises:
   prior to transmitting the modified electronic data collection to the digital response repository, comparing the modified electronic data collection to a publication policy to determine an access privilege level for the modified electronic data collection; and
   upon verifying that the digital response repository matches the access privilege level, selecting the digital response repository as a location where the modified electronic data collection is to be stored.

18. The non-transitory computer-readable storage medium of claim 15, wherein the set of actions further comprises:
   determining a redaction-confidence score for the modified electronic data collection based on scoring rules included in the redaction policy;
   upon detecting that the redaction-confidence score meets a second threshold, presenting an element that influenced the redaction-confidence score to a user via an electronic display; and
   receiving, via an input/output (I/O) device, user input indicating that the modified electronic data collection complies with the redaction policy.

19. The non-transitory computer-readable storage medium of claim 15, wherein the set of actions further comprises:
   receiving, via a website, an electronic request for information associated with a second topic;
   upon determining that the digital response repository does not contain a redacted version of a second electronic data collection associated with the second topic, extracting a second set of features for the second electronic data collection;
   generating a training instance that comprises the second set of features and a label that indicates the electronic request was received for the second topic; and
   training the machine-learning model using the training instance.

20. The non-transitory computer-readable storage medium of claim 15, wherein the topic is an incident, and wherein the set of features comprises features that indicate one or more of the following: an incident type, a time when the incident occurred, a location where the incident occurred, a currency value of property involved in the incident, or whether force was used by agents of the entity during the incident.

* * * * *